United States Patent Office.

GUSTAVE DAUBENSPECK, OF LONDON, ENGLAND.

REFRACTORY INCANDESCENT MANTLE OR HOOD.

SPECIFICATION forming part of Letters Patent No. 657,235, dated September 4, 1900.

Application filed April 13, 1900. Serial No. 12,769. (No model.)

*To all whom it may concern:*

Be it known that I, GUSTAVE DAUBENSPECK, a subject of the Queen of Great Britain and Ireland, residing at London, England, have invented a certain new and useful Improvement in and Relating to Refractory Incandescent Mantles or Hoods, of which the following is a specification.

My invention relates to the manufacture of refractory mantles or hoods which will become brilliantly incandescent under the heat of a flame; and it consists of improvements in the composition of matter forming the same and in the treatment of the mantle during manufacture to produce entirely without the use in its composition of any rare earths or metals or of any salts of the same a very cheap, durable, and serviceable article.

I have found by lengthy experiments that the ordinary refractory materials—viz., salts, oxids, hydrates, or chlorids of calcium—which incandesce brilliantly under great heat may be rendered sufficiently tough and durable to retain their form when applied as a deposit to filaments to form a light mantle by treating the same with a superacidified solution of suitable salts of aluminium and magnesium, the presence of free acid in the solution serving to effect or insure chemical conversion and reaction (in the form of oxidation of the bases) among the ingredients as a whole *in situ* upon the supporting-filament when the mantle is finally subjected as part of the process of manufacture to the heat of a powerful flame, which also serves the purpose of burning and volatilizing the organic and carbonaceous matter of the filament. Such chemical reaction is effected without injury to the brilliance of the ingredients under incandescence by the use of the materials approximately in the proportions and in the manner hereinafter described.

To carry my invention into effect, I prepare a strong solution of chlorid of calcium or chlorid of lime, of which I prefer the latter, and by dipping a purified filament or a framework of filaments therein I obtain a coating of the calcium salt thereon in the usual way. The mantle is then dried. I then prepare a second solution composed of a mixture of a salt of aluminium (preferably nitrate of aluminium) and nitrate of magnesium and superacidify the solution by the addition of an acid, so that free acid remains present. I find hydrochloric acid to be the best for such use as regards the above salts. The following proportions for this solution give a good incandescence to the finished mantle with great durability: nitrate of aluminium, seventy-four parts; nitrate of magnesium, twenty-three parts, and hydrochloric acid, three parts. By varying these proportions slightly different relative degrees of incandescence and toughness or durability can be obtained. For instance, the composition as above stated gives a bright white light. If a warmer and more yellow light is desired, the nitrate of aluminium may be added in further excess, or sulfuric acid may be used as the free acid, with the effect of rendering the light blue, but more dull, and if sulfuric acid be added to the above composition the effect is a bluish but bright incandescence. If I use sulfates of aluminium and magnesium, I may add thereto either nitric or hydrochloric acid with good results in the proportions as above stated. The filament or mantle is dipped in said second solution, dried, and again dipped and dried, if desirable. The mantle being thus dried, I preferably apply to the head or upper part of the mantle a solution of nitrate of aluminium and nitrate of magnesium alone, conveniently applied with a brush, to further strengthen the head of the structure, even with some diminution of the incandescence of the material at that part. The mantle is finally dried and then subjected to a flame of intense heat, such as that of a Bunsen burner, which volatilizes and burns away all organic and carbonaceous matter of the filaments and mantle and leaves a tough mineral ash of brilliant incandescent qualities. The product is a mantle of superior illuminating power and that will compare favorably with others as to strength or toughness, which is composed exclusively of oxids of calcium, aluminium, and magnesium (the term "oxids" being used in a broad sense) produced *in situ* by chemical reactions due to the subjection of the common and inexpensive mineral salts first mentioned in substantially the described proportions to converting heat in the presence of an excess of acid, which is rendered common to all the ingredients by the application of the superacidified solution before the mantle is burned. The excess of acid present at the final burning serves to facilitate the immediate and prompt conversion of the metals present in the described proportions into the condition of oxids, and in other ways, perhaps, not as yet fully understood, and to aid materially in obtaining the final product. Prepared from the two solutions above described, including the superacidified second solution, the mantle becomes brilliantly incandescent at once upon burning it and is at the same time sufficiently tough for commercial purposes. Without the presence of the free acid at the burning no brilliancy ensues for a long time, six or eight days burning being required to produce a sensible result. For transport of the mantles before use they are protected in the usual way by a protective covering, such as collodion.

Having now described my invention, what I claim, and desire to secure by Letters Patent, is—

1. The improved process of manufacturing an incandescent mantle or hood consisting in dipping a filament or framework of filaments in a solution of a salt of calcium; drying the same; then dipping the same in a superacidified solution of salts of aluminium and magnesium; drying the same; and finally subjecting the mantle or hood to the heat of a powerful flame for the completion of the reaction of the free acid of said superacidified solution on said salts of calcium aluminium and magnesium, and the combustion of the organic and carbonaceous matter of the framework of filaments.

2. In the manufacture of an incandescent mantle or hood, the treatment of a filament or framework of filaments already covered by a deposit of a calcium salt by dipping the same in a superacidified solution composed of approximately seventy-four parts of nitrate of aluminium, twenty-three parts of nitrate of magnesium, and three parts of hydrochloric acid, drying the same, and finally heating the whole in a powerful flame until the salts of calcium, aluminium and magnesium are converted into an oxid or oxids in the presence of the free acid of said superacidified solution.

3. An incandescent mantle or hood formed of a salt of calcium treated in the manner set forth with a superacidified solution of salts of aluminium and magnesium, and composed exclusively of oxids of calcium, aluminium and magnesium, substantially as hereinbefore specified.

In witness whereof I have hereunto set my hand in presence of two witnesses.

GUSTAVE DAUBENSPECK.

Witnesses:
REGINALD W. JAMES,
CHARLES CARTER.